United States Patent [19]

Stastny

[11] Patent Number: 5,458,433
[45] Date of Patent: Oct. 17, 1995

[54] BISCUIT AND JOINT MADE USING SAME

[76] Inventor: James M. Stastny, 3111 Breezy Hill Rd., Fennimore, Wis. 53809

[21] Appl. No.: 352,454

[22] Filed: Dec. 9, 1994

Related U.S. Application Data

[63] Continuation of Ser. No. 12,764, Feb. 3, 1993, abandoned.

[51] Int. Cl.⁶ .............................. F16B 13/00; B27M 3/18
[52] U.S. Cl. ....................... 403/408.1; 403/294; 403/292; 144/353; 144/136 C
[58] Field of Search .................................. 403/297, 292, 403/294, 408.1, 403; 144/353, 136 C

[56] References Cited

U.S. PATENT DOCUMENTS

| 692,028 | 1/1902 | Page ................................. 144/136 C |
| 1,436,584 | 11/1922 | Fiebig . |
| 2,332,081 | 10/1943 | Hunt et al. ......................... 403/294 X |
| 2,872,731 | 2/1959 | Greenwood ....................... 144/136 C |
| 4,926,916 | 5/1990 | Legler et al. . |
| 5,257,654 | 11/1993 | Bean et al. . |

FOREIGN PATENT DOCUMENTS

| 2435585 | 5/1970 | France .................................. 403/294 |
| 11369 | of 0000 | United Kingdom .................. 144/240 |
| 20506 | 3/1910 | United Kingdom ............... 144/136 C |
| 617790 | 2/1949 | United Kingdom .................. 403/297 |

*Primary Examiner*—Anthony Knight

[57] ABSTRACT

A biscuit having an octagonal outer periphery is used to form a joint between first and second workpieces. The biscuit fits within arcuate slots formed in the workpieces, with glue placed in the slots and/or on the biscuit before the joint is put together. The biscuit is made of an anhydrous compressed wood.

6 Claims, 5 Drawing Sheets

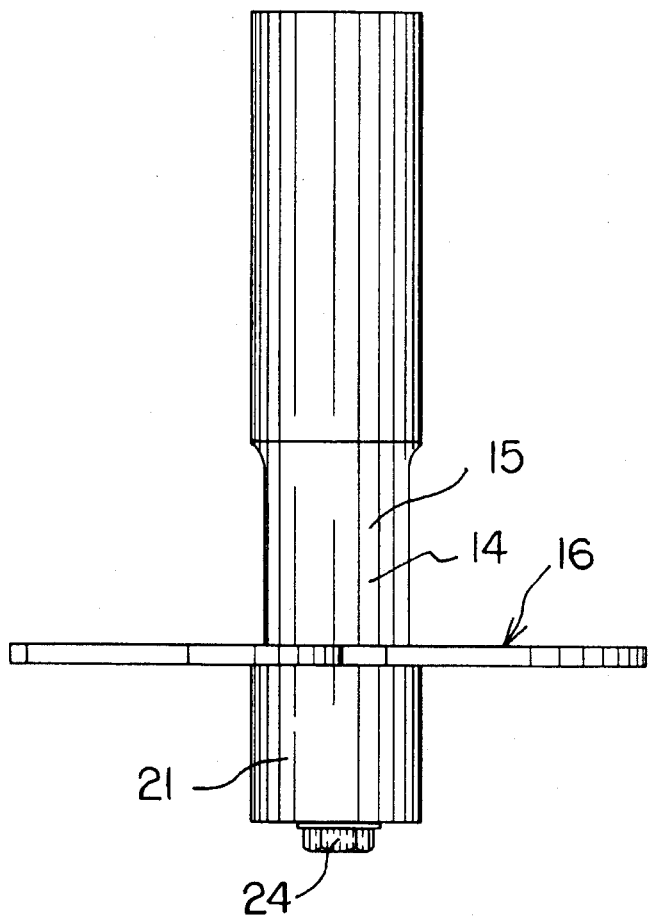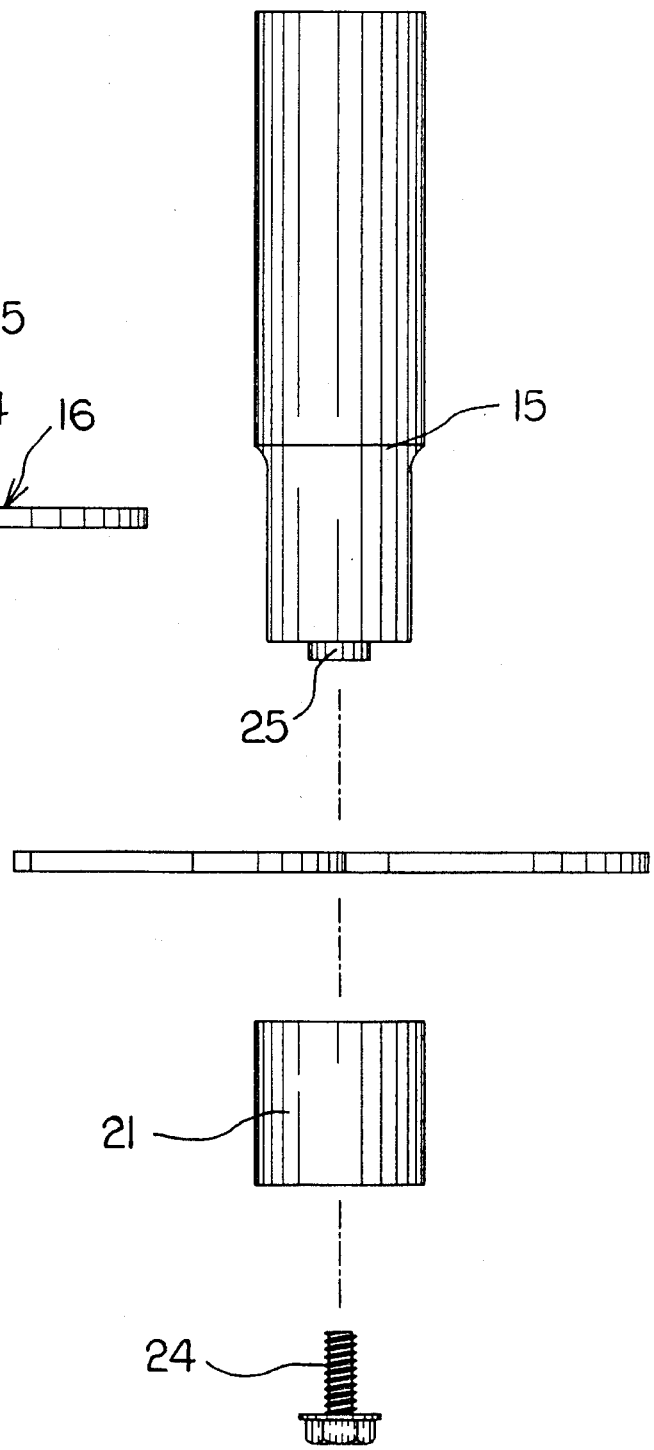

FIG. 9
FIG. 10
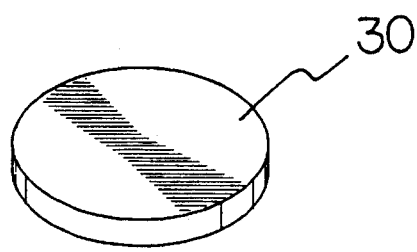
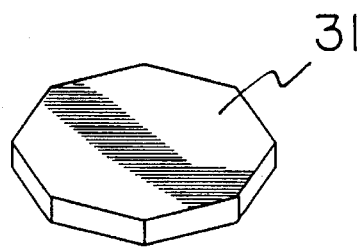
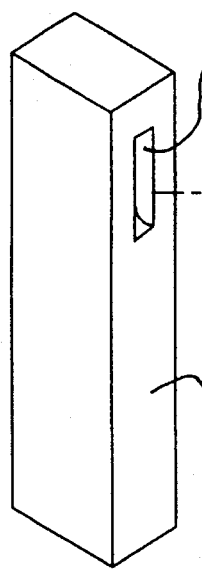
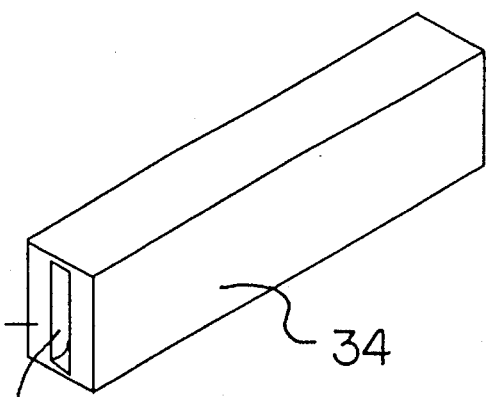
FIG. 7
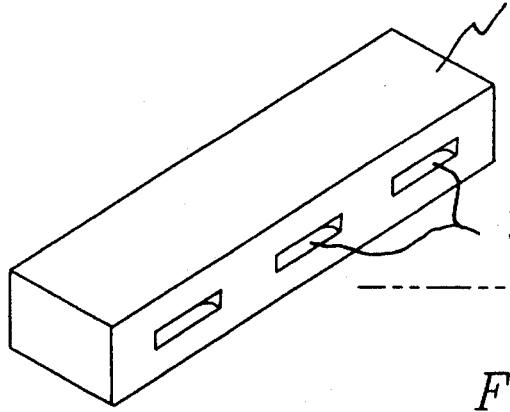
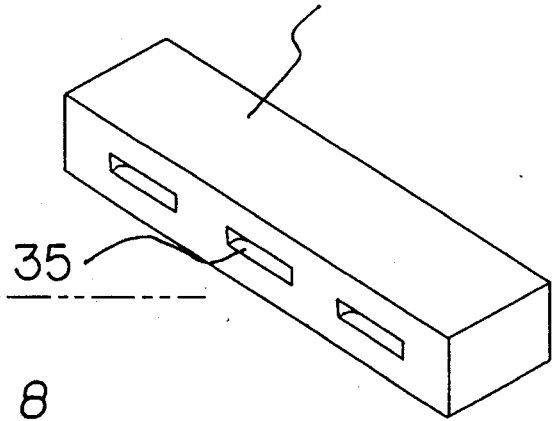
FIG. 8

BISCUIT AND JOINT MADE USING SAME

This application is a continuation of application Ser. No. 08/012,764, filed Feb. 3, 1993, now abandoned.

BACKGROUND OF THE INVENTION

1. Field of the Invention

The field of invention relates to woodworking tool structure, and more particularly pertains to a new and improved biscuit slot cutting tool apparatus wherein the same is arranged to direct a slot within an end face of a workpiece.

2. Description of the Prior Art

A biscuit slot is directed into an end face of a workpiece to permit subsequent positioning of a bridge plate for reception within adjacent slots within workpieces to permit the securement of the workpieces together, such as by adhesives and the like, in a woodworking procedure. The instant invention attempts to overcome deficiencies of the prior art by providing for a convenient, readily positioned, and effective structure to provide for the cutting of slots within an end face of a workpiece.

The U.S. Pat. No. 4,926,916 to Legler sets forth an assembly tool for adjoining of a plurality of workpieces together employing a biscuit connection.

As such, it may be appreciated there continues to be a need for a new and improved biscuit slot cutting tool as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of woodworking tool apparatus now present in the prior art, the present invention provides a biscuit and tool for cutting biscuit slots wherein the same is directed to the cutting of slots within an end face of a workpiece by a rotary tool structure. As such, the general purpose of the present invention, which will be described subsequently in greater detail, is to provide a new and improved biscuit slot cutting tool which has all the advantages of the prior art cutting tool apparatus and none of the disadvantages.

To attain this, the present invention provides a tool structure for cutting a slot within an end face of a workpiece, with the tool having a shank and a rotary blade mounted intermediate the shank, with the shank including a rotary bearing mounted to a lower end of the shank below the rotary blade for guiding and engaging the workpiece.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved biscuit and tool for cutting biscuit slots which has all the advantages of the prior art biscuit and tool for cutting biscuit slots and none of the disadvantages.

It is another object of the present invention to provide a new and improved biscuit and tool for cutting biscuit slots which may be easily and efficiently manufactured and marketed.

It is a further object of the present invention to provide a new and improved biscuit and tool for cutting biscuit slots which is of a durable and reliable construction.

An even further object of the present invention is to provide a new and improved biscuit and tool for cutting biscuit slots which is susceptible of a low cost of manufacture with regard to both materials and labor, and which accordingly is then susceptible of low prices of sale to the consuming public, thereby making such biscuit slot cutting tool economically available to the buying public.

Still yet another object of the present invention is to provide a new and improved biscuit and tool for cutting biscuit slots which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view of the invention.

FIG. 4 is an orthographic side view of the invention in a disassembled configuration.

FIG. 7 is an isometric illustration of the workpiece invention employing a single biscuit slot.

FIG. 8 is an orthographic end view of the workpiece invention, employing a plurality of biscuit slots.

FIGS. 9 and 10 are isometric illustrations of biscuit members employed by the invention.

DESCRIPTION OF THE PREFERRED EMBODIMENT

Figure 1:
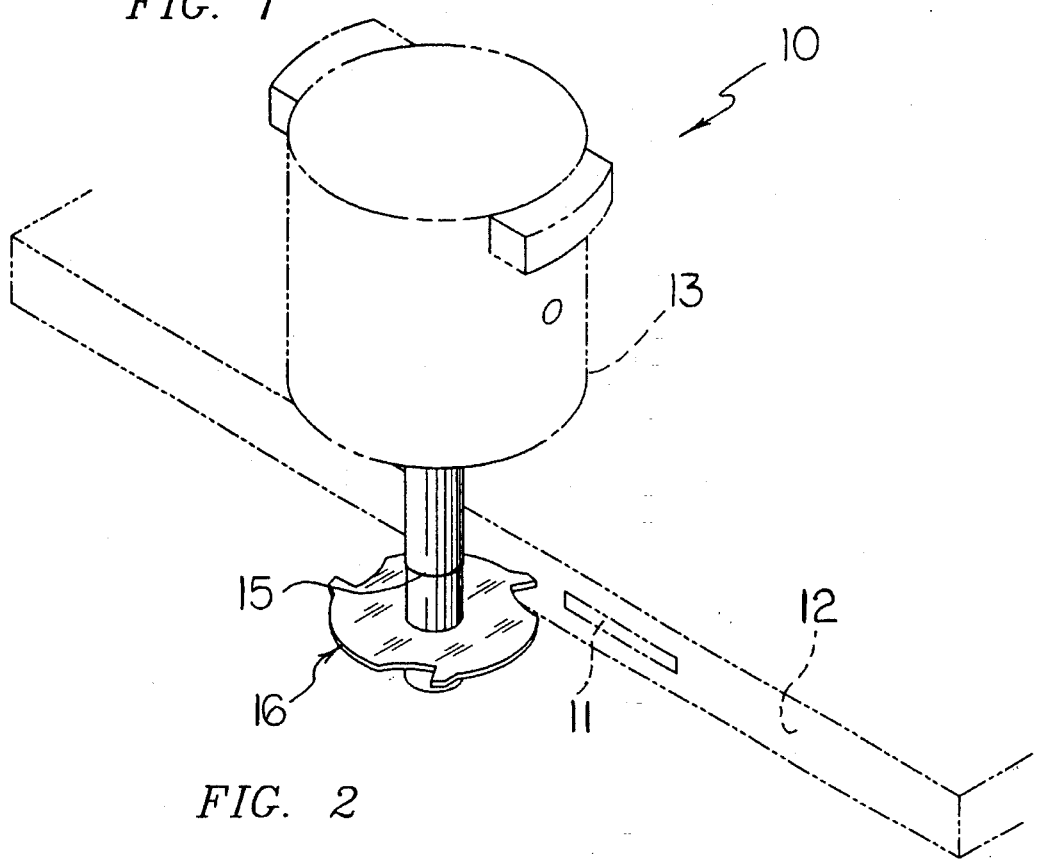
FIG. 1 is an isometric illustration of the invention.
Figure 2:
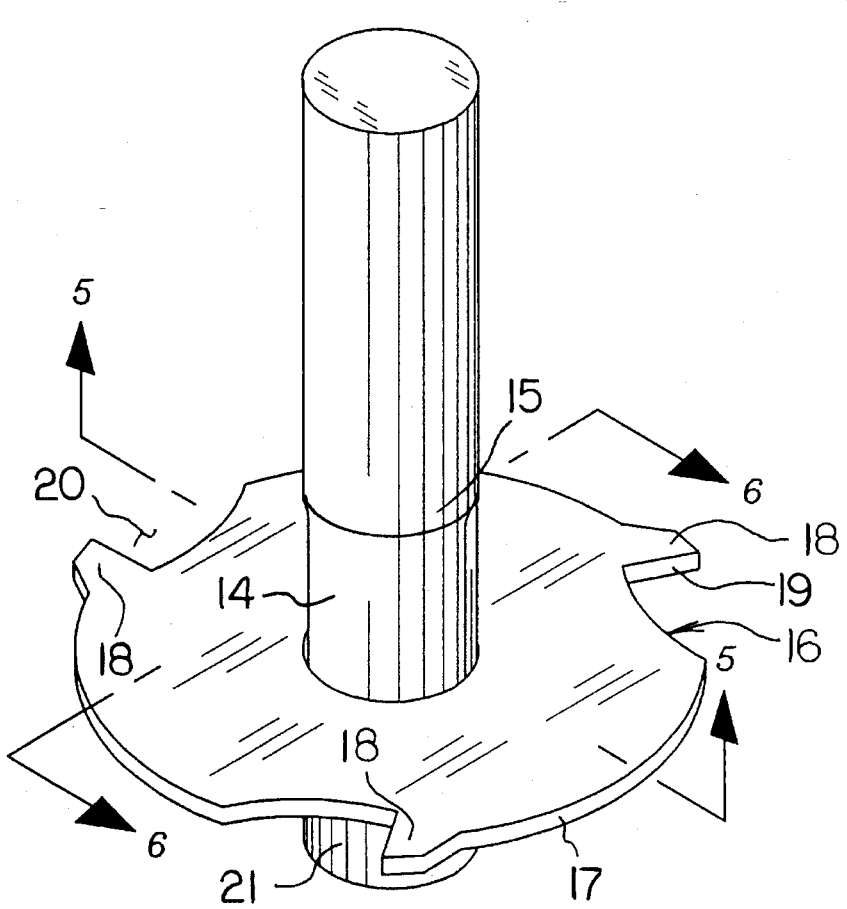
FIG. 2 is an enlarged isometric illustration of the invention separated from an associated rotary tool such as a router.
Figure 5:
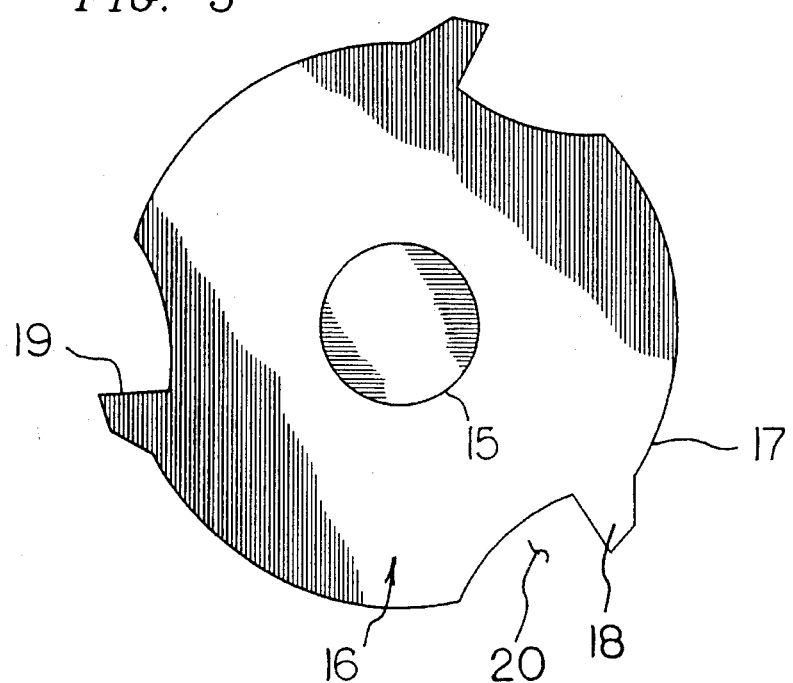
FIG. 5 is an orthographic top view of the invention.
Figure 6:
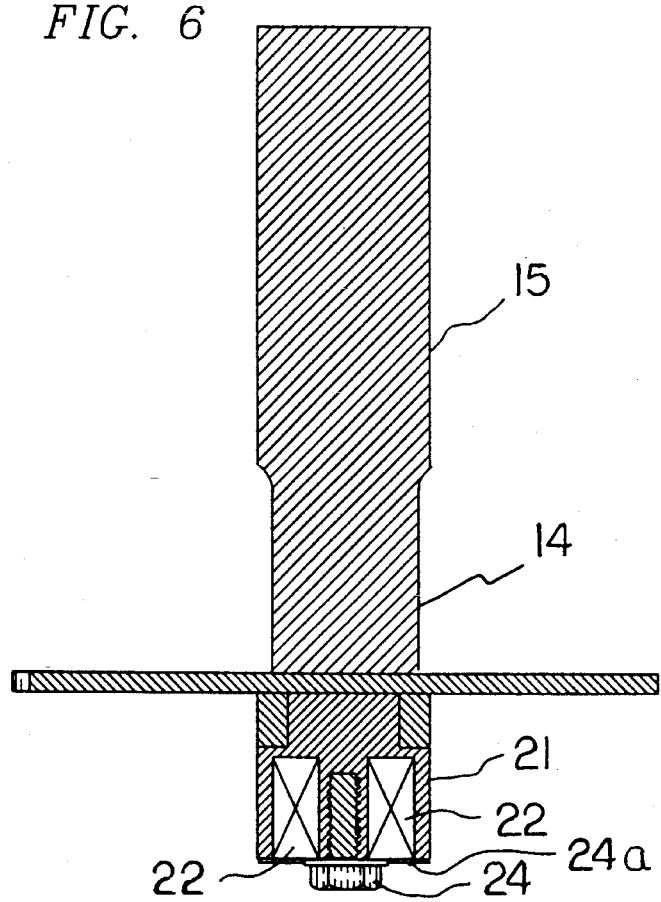
FIG. 6 is an orthographic cross-sectional illustration of the invention.

With reference now to the drawings, and in particular to FIGS. 1 to 11 thereof, a new and improved biscuit and tool for cutting biscuit slots embodying the principles and concepts of the present invention and generally designated by the reference numeral 10 will be described.

More specifically, the biscuit and tool for cutting biscuit slots 10 of the invention essentially comprises the directing of a slot 11 into an end wall of an associated workpiece 12, as indicated in FIG. 1. To this end, a rotary tool 13, such as a router for example, receives a tool shank portion 11 of the tool structure 10. The tool shank 11 is of a first diameter and integrally associated with a shank body 15 of a second diameter greater than the first diameter and coaxially aligned with the tool shank 14. The tool shank 14 extends to a rotary blade 16 and is oriented intermediate the shank body 15 and the blade 16. The rotary blade 16 is coaxially aligned with the tool shank 14 and the shank body 15 in an orthogonal relationship, with the rotary blade 16 having an annular periphery 17 formed with spaced radially projecting teeth 18. Typically, carbide teeth are employed for longevity of the cutter blade 16 in use. Each of the teeth 18 includes a tooth front wall 19 having a blade recess 20 directed into the rotary blade 16 between each tooth front wall 19 and the annular periphery 17 to provide for relief slots during a cutting procedure. A rotary cylindrical bushing 21 is mounted below the blade 16, having bearings 22 rotatably mounting the bushing 21 about a shank body boss 25 that is coaxially aligned with the tool shank 14 and receiving a mounting fastener 24 therewithin to capture the bushing 21 between a mounting plate 2a and a lowermost end of the shank body 15.

The FIGS. 9 and 10 indicate the use of the disc-like biscuit structure 30 or the octagonal biscuit structure 31 for use. Typically, biscuits commercially available are of sizes numbered as Number zero, Number ten, and Number twenty. The instant invention is numbered as Number zero-zero, wherein the biscuits are formed of compressed wood of anhydrous construction, whereupon exposure to adhesives such as fluid glues and the like effects a swelling of the biscuits, particularly when the biscuits are received within respective first and second biscuit slots 33 and 35 of respective first and second workpieces 32 and 34. Multiple slots 33 and 35 may be employed relative to the first and second workpieces 32 and 34, as indicated in FIG. 8 relative to the unitary slot construction of the FIG. 7 and the joining of multiple workpieces together. Further, the glue is applied to the biscuits 30 or 31 and inserted into the slots 33 and 34 subsequent to the swelling of the biscuits in absorption of the fluid glue, a tight boding of the workpieces are effected. The advantage of the octagonal biscuit construction 31 permits the accommodation of two-inch boards, with the advantages of the circular biscuit permitting boards of smaller width to be employed and further permitting a deeper penetration of the board within the associated slot structure of the workpiece. Preferably, the present invention utilizes the orthogonal biscuit structure 31 which comprises a substantially planar member having a plurality of diametrically opposed and parallel sides (not labeled) which cooperate to define a substantially octagonal perimeter extending around the planar member. The octagonal construction of the biscuit construction 31, as indicated in FIG. 10, provides for recesses or pockets formed when the biscuit is positioned within an associated slot to accommodate a greater quantity of glue within the slot construction. The greater quantity of glue is retained within fluid spaces defined between an interior arcuate side wall of the slot and the straight sides of the octagonal biscuit structure.

Figure 11:
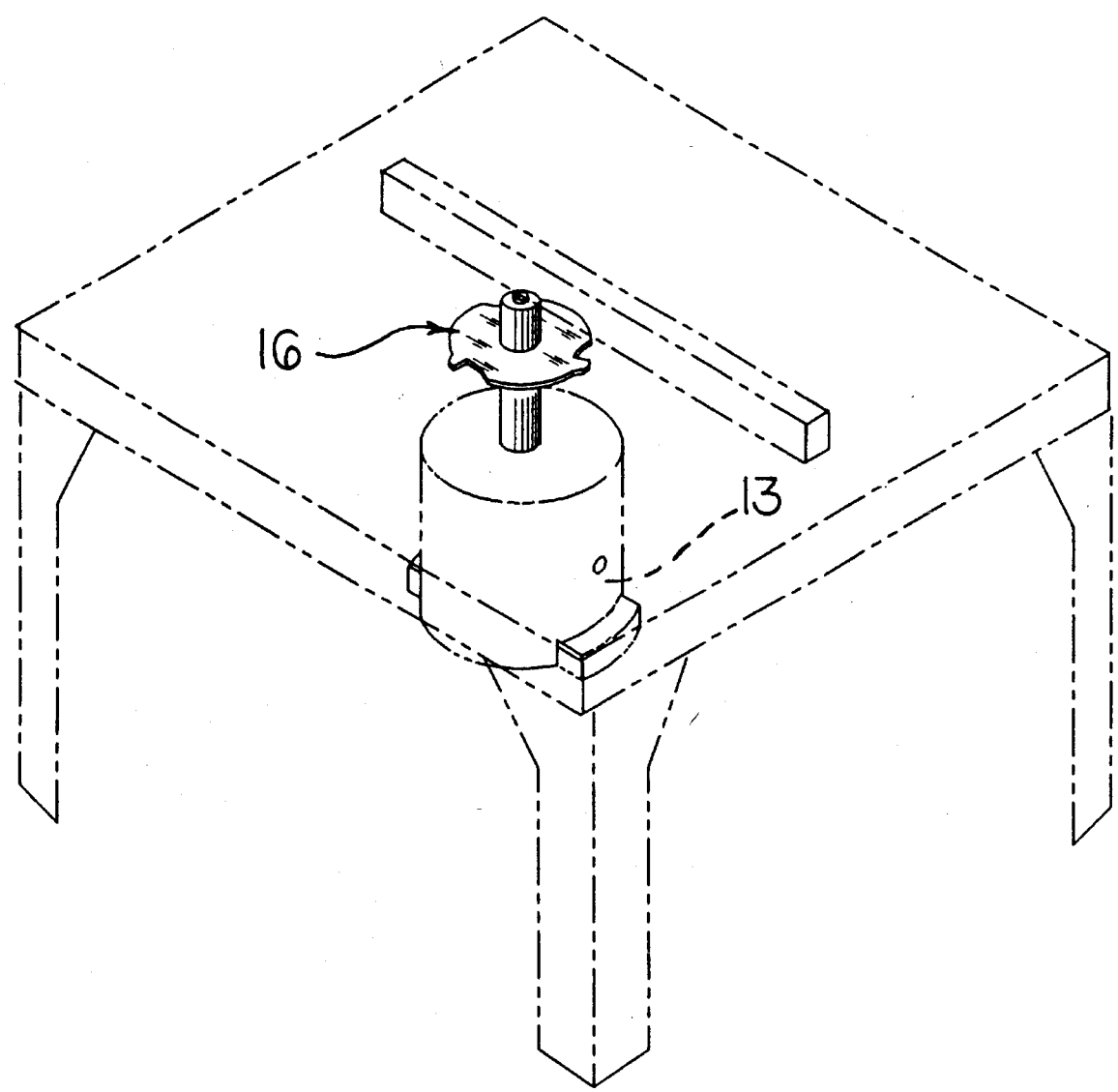
FIG. 11 is an isometric illustration of the invention employed in a router organization.

The FIG. 11 indicates the utilization of the invention in a router-type environment, wherein the drive motor 13 is positioned below a router table providing ease of access to a workpiece to receive a biscuit slot cut therewithin. In this manner, the drive motor is positioned below the router table, whereupon guides may be positioned upon the table top for directing the workpiece relative to the cutter.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A biscuit for use with a first workpiece having a first arcuate slot formed therein and a second workpiece having a second arcuate slot formed therein, said biscuit comprising:

a substantially planar member having a periphery defined by a plurality of diametrically opposed and parallel sides, said periphery defining a plurality of corners at intersections of adjacent sides, wherein said planar member is positionable within both said first arcuate slot of said first workpiece and said second arcuate slot of said second workpiece with said corners abuttingly engaging the arcuate walls of said arcuate slots to define fluid spaces between said walls and said sides such that an adhesive can reside within and adhesively engage said sides and said walls to couple said planar member to said workpieces to join said workpieces together.

2. The biscuit of claim 1, wherein said planar member is formed of a substantially anhydrous compressed wood wherein said biscuit expands upon exposure to an adhesive.

3. A biscuit for use with a first workpiece having a first arcuate slot formed therein and a second workpiece having a second arcuate slot formed therein, said biscuit comprising:

a substantially planar member having an octagonal periphery defined by a first pair of sides positioned in a diametrically opposed and parallel relationship to one another, a second pair of sides positioned in a diametrically opposed and parallel relationship to one another and positioned adjacent said first pair of sides, a third pair of sides positioned in a diametrically opposed and parallel relationship to one another and positioned adjacent said second pair of sides, and a fourth pair of sides positioned in a diametrically opposed and parallel relationship to one another and positioned between said first pair of sides and said third pair of sides, said octagonal periphery defining a plurality of corners at intersections of adjacent sides, wherein said planar member is positionable within both said first arcuate slot of said first workpiece and said second arcuate slot of said second workpiece with said corners abuttingly engaging the arcuate walls of said arcuate slots to define fluid spaces between said walls and said sides such that an adhesive can reside within and adhesively engage said sides and said walls to couple said planar member to said workpieces to join said workpieces together.

4. The biscuit of claim 3, wherein said planar member is formed of a substantially anhydrous compressed wood wherein said biscuit expands upon exposure to an adhesive.

5. A biscuit joint comprising:

a first workpiece having a first arcuate slot formed therein;

a second workpiece having a second arcuate slot formed therein;

a substantially planar member having an octagonal periphery defined by a first pair of sides positioned in a diametrically opposed and parallel relationship to one another, a second pair of sides positioned in a diametrically opposed and parallel relationship to one another and positioned adjacent said first pair of sides, a third pair of sides positioned in a diametrically opposed and parallel relationship to one another and positioned adjacent said second pair of sides, and a fourth pair of sides positioned in a diametrically opposed and parallel relationship to one another and positioned between said first pair of sides and said third pair of sides, said octagonal periphery defining a plurality of corners at intersections of adjacent sides, wherein said planar member is positioned partially within both said first arcuate slot of said first workpiece and said second arcuate slot of said second workpiece with said corners abuttingly engaging the arcuate walls of said arcuate slots to define fluid spaces between said walls and said sides;

and, an adhesive residing within said fluid spaces and adhesively engaged to both said sides and said walls to couple said planar member to said workpieces to join said workpieces together.

6. The biscuit of claim 5, wherein said planar member is formed of a substantially anhydrous compressed wood wherein said biscuit expands upon exposure to an adhesive.

* * * * *